SENSING SYSTEM FOR MAGNETICALLY RECORDED SIGNALS

Filed Jan. 5, 1949

INVENTORS
RAYMOND E. CHENEY
JOHN L. WAGNER
ROBERT E. LAWHEAD
BY John R. Shipman
ATTY.

Patented Feb. 7, 1950 2,496,579

UNITED STATES PATENT OFFICE 2,496,579

SENSING SYSTEM FOR MAGNETICALLY RECORDED SIGNALS

Raymond E. Cheney, Endicott, John L. Wagner, Endwell, and Robert E. Lawhead, Vestal, N. Y., assignors to International Business Machines Corporation, New York, N. Y., a corporation of New York Application January 5, 1949, Serial No. 69,342

12 Claims. (Cl. 235—61.11)

This invention relates to a system for sensing and reproducing signals which have been magnetically recorded on a suitable tape or wire. More particularly, it relates to such a device for sensing and reproducing discrete voltage impulses so recorded.

In reading magnetically recorded signals representing audible sounds, it is familiar practice to sense and reproduce the signals by means of a sensing coil connected to feed an amplifier. A tape of suitable magnetic material on which the signals are recorded is moved by the coil and the resulting flux changes about the coil induce corresponding voltages therein which are then amplified by the amplifier. This arrangement provides an output which is a faithful, high fidelity reproduction of the recorded signal.

The arrangement as just described may also be used in reading discrete voltage impulses recorded as discrete magnetized spots on a tape or wire. However, in doing so, a number of difficulties have been encountered. In most electric impulse systems, such as those used in automatic accounting machines, a faithful, high fidelity reproduction of the recorded impulses is not necessary but instead it is highly desirable to obtain a very high signal peak when each recorded impulse is read. The signal obtained from the sensing coil is of a fairly low level. In addition, the ratio of the signal to the extraneous noise picked up is small.

The amplitude of the signal impulse obtained from the sensing coil in such prior apparatus may be increased by increasing the speed of the tape causing a greater rate of change of flux. However, such increase in speed with a discrete impulse system not only involves the problem of providing a more rapid drive but also results in a very inefficient and uneconomical use of the tape. Moreover, it does not solve the question of extraneous noise pickup from vibration and/or random magnetic fields.

It is accordingly an object of our invention to provide a new and improved system for sensing and reproducing discrete voltage impulse signals magnetically recorded on a suitable tape which provides a very high signal peak.

Another object is to provide such a sensing and reproducing system from which may be obtained a very high signal peak with a substantial elimination of spurious noise signals in the output.

A further object is to provide a novel sensing system in which the signal output is, for practical purposes, substantially independent of the tape speed.

More specifically, it is an object of our invention to provide a new and improved system for sensing and reproducing discrete voltage impulses magnetically recorded on a suitable tape which provides a high signal peak at a low tape speed while eliminating spurious noise signals.

In accordance with our invention a sensing and reproducing system is provided which comprises a sensing coil coupled to an amplifier, the coil being positioned adjacent the path of the tape. A short circuiting connection is provided across the sensing coil whereby a varying flux as produced by a magnetized spot passing the coil causes a circulating current through the connection and coil to build up a counter flux about the coil. Means are then provided to interrupt the short circuiting connection momentarily during the passing of each spot by the coil at a time when the circulating current and therefore the counter flux reaches approximately a maximum. Thus the circulating current is interrupted when it is relatively high and as a result the counter flux built up in the coil collapses very rapidly causing a very high peak voltage impulse to appear across the sensing coil. The short circuiting connection is maintained at all times except during the momentary interruption for each spot. Consequently, the input to the amplifier is maintained at substantially zero except during the momentary interruption when a high voltage impulse caused by a magnetized spot is supplied to the amplifier.

It has been found that the signal voltage produced by interrupting the short circuit circulating current in the sensing coil in this manner is many times higher than the signal obtained from the sensing coil at ordinary tape speeds in the prior arrangement described. It is then evident that the desired high peak signal can be obtained from the sensing coil at reduced tape speeds, permitting efficient use of the tape, and the input to the amplifier becomes for practical purposes, independent of the tape speed. It is also to be noted that no spurious noise signals are supplied to the amplifier between impulses in our system because the sensing coil is short-circuited.

Another feature of the invention is that a simple and a positive method of cancelling a recorded signal may be employed. By cancelling a signal we do not mean a complete erasure of the signal but rather a provision whereby the signal is not reproduced by the sensing system. Ordinarily, cancellation presents a difficult problem inasmuch as most impulse recording is done under static conditions. It is not practical to use an alternating field as some means of synchronized wave cut off would be necessary to insure reducing the magnetic level below pickup strength. With the new system described herein, cancellation may be very simply and positively accomplished by merely reversing the polarity of the magnetized spot representing an impulse. When the polarity is reversed, the resulting signal obtained from the sensing coil is of opposite polarity so that an electronic tube amplifier responsive to only the original polarity will not respond thereto.

By coupling a second amplifier to the sensing coil which is responsive to impulses of opposite polarity with respect to the first amplifier, a sensing and reproducing system is provided which may be used in impulse systems employing two different signals. In some systems two different signals are desirable—one to represent a first condition or value and the second to represent a second condition or value. Such different signals may be readily recorded on magnetic tape by recording signals of the first type as magnetized spots of one polarity and signals of the second type as magnetized spots of the opposite polarity. When these magnetized spots are picked up by the sensing coil of this invention, the voltage impulses of opposite polarities for the two different types of signals are produced across the sensing coil and the corresponding one of the two amplifiers responds thereto.

Other objects and advantages of this invention are set forth in the following description and claims and are illustrated in the accompanying drawings, which disclose, by way of example, the principle of the invention and the best mode, which has been contemplated, of applying that principle.

Figure 1:
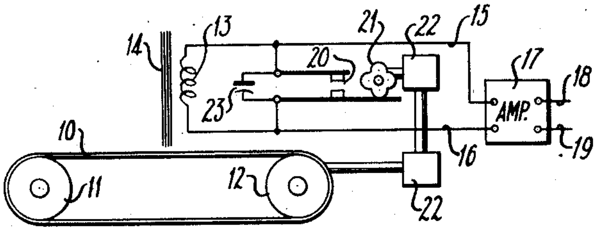
Fig. 1 is a schematic diagram including the circuits of a sensing system incorporating the invention.

As shown in Fig. 1 a suitable wire or tape 10 having discrete voltage impulses recorded thereon as discrete magnetized spots, is mounted on a pair of roller pulleys 11 and 12. One of the pulleys 12 is driven by a suitable source of power (not shown) to move the tape 10 in the direction indicated by the arrows.

A sensing coil 13 having a core 14 is positioned adjacent one point on the movable tape 10. The sensing coil 13 is coupled by wires 15 and 16 to a suitable amplifier 17. The output of the amplifier may be taken from wires 18 and 19 connected thereto. A normally closed switch 20 is connected across the sensing coil 13 and arranged to be opened by a cam 21. A suitable gearing 22 interconnects the cam 21 and the pulley 12 so that the cam opens the switch 20 at a particular time with respect to the location of a magnetized spot on the tape 10 as described hereinafter. A capacitor 23 is connected in parallel with the switch 20.

In considering the operation of the system shown in Fig. 1, it is to be understood that as the tape 10 moves by the sensing coil 13, the noise picked up and the recorded magnetized spots provide a varying flux linking the coil windings which tends to induce a voltage across the coil. Ignoring, for the moment, the noise picked up, the voltage induced across the coil by the passage of a magnetized spot would have a wave form, if the coil were not short-circuited by switch 20, as shown at 25 in curve A of Fig. 3. However, with the sensing coil 13 short-circuited by closed switch 20, a voltage would not appear across the coil upon passage of a magnetized spot but a circulating current would be produced through the coil and switch having a wave form as shown at 26 in curve B of Fig. 3. Such circulating current would, of course, build up a counter flux about the coil of a magnitude corresponding to the magnitude of the circulating current. The wave form in curve B, as shown, is typical but can be modified by changes in the electromechanical components so as to change the peak amplitude ratio above and below the axis to any reasonable degree.

Figure 3:
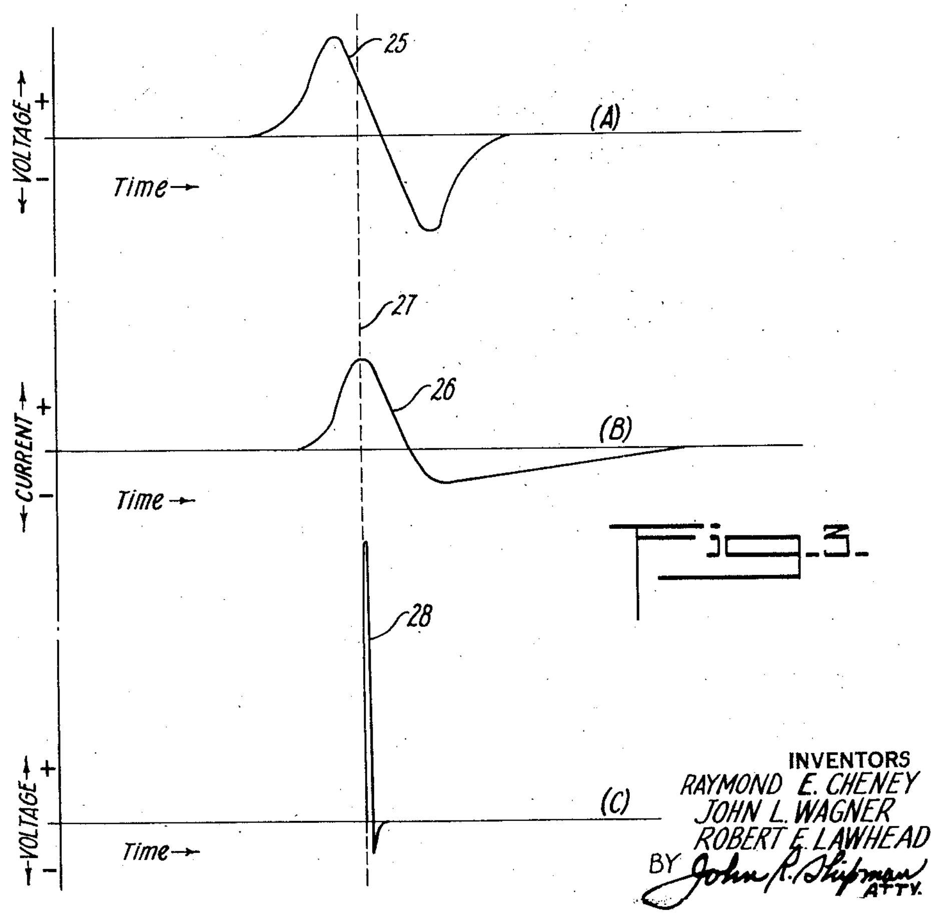
Fig. 3 is a series of curves illustrating the operation of the system shown in Fig. 1

It will be understood that the noise picked up would produce an irregular wave in addition in curves A and B of Fig. 3.

In operation, the switch 20 is normally closed so that as a magnetized spot approaches the sensing coil, no substantial voltage appears across the coil but a circulating current is produced through the coil and switch. When the flux and the circulating current reach approximately a maximum as at line 27 in Fig. 3, cam 21 operates to open the switch 20. This, in effect, interrupts the circulating current and places the capacitor 23 in circuit with the sensing coil 13. Upon this interruption, the built up counter flux collapses very rapidly, the capacitor 23 being chosen to cause a more rapid collapse. Accordingly, the circulating current drops rapidly from a maximum and the collapse in flux causes a very high voltage impulse to appear across the sensing coil 13 as represented at 28 in curve C of Fig. 3, which curve illustrates the voltage supplied by the sensing coil to the amplifier corresponding to passage of a single magnetized spot by the coil. The switch 20 is then reclosed.

It is evident that so long as switch 20 remains closed, no voltage is supplied to the amplifier in response to either noise pickup or a magnetized spot. When switch 20 is opened at the time represented by line 27, the high voltage impulse represented by line 28 in curve C is supplied to the amplifier. This voltage impulse is of high magnitude and short duration and may have a small negative pip at the end because of the circuit inductance and capacity. After the voltage impulse 28 is supplied to the amplifier, switch 20 is again closed by the cam 21 so that no voltage is supplied to the amplifier until the next time the switch 20 is opened.

A gearing arrangement 22 has been represented in Fig. 1 in connection with the cam 21 to synchronize the operation of the switch 20 and the movement of magnetized spots by the sensing coil. This synchronization may be accomplished by providing the tape 10 with a plurality of spaced index points to be moved by the sensing coil in succession, a magnetized spot to be located on the tape only at an index point. The gearing 22 may then be arranged to cause the switch 20 to be opened at the desired time during the passage of each index point by the sensing coil. It will be obvious to those skilled in the art that other suitable synchronizing arrangements may be readily employed. It is, of course, desirable that the switch 20 be opened when flux and circulating current is at a maximum but it is only necessary that the switch be opened when the flux is sufficiently great that its collapse produces a usable signal.

Figure 2:
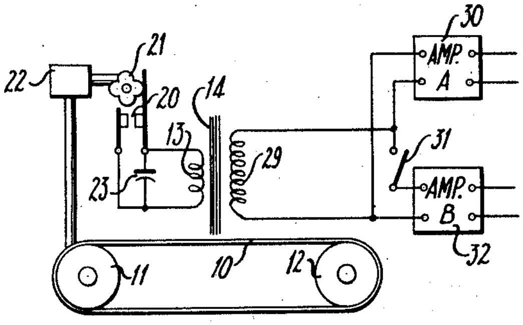
Fig. 2 is a schematic diagram of a modification of the system of Fig. 1.

The modification shown in Fig. 2 is similar to the arrangement of Fig. 1 and the same reference numbers have been applied to the same elements in the drawing. However, in this modification the sensing coil 13 is not connected directly to an amplifier but instead is coupled to a second coil 29 with a transformer action. The second coil 29 is connected to supply a first amplifier 30 responsive to signals of one polarity. The coil 29 may also be connected through a switch 31 to a second amplifier 32 responsive to signals of opposite polarity. Both of the systems of Fig. 1 and Fig. 2, may of course be used with either one or two amplifiers as desired.

The operation of the system shown in Fig. 2 is substantially the same as that described for Fig. 1 with the exception that the coupling of the sensing coil 13 to the amplifier through the second coil 29 provides an increased output because of the transformer action. In addition, this modification is arranged for use with a system employing two different pulses to represent two different conditions or values. Thus, by closing switch 31 both amplifiers 30 and 32 are coupled to the sensing coil so that impulses of one polarity produced by a magnetized spot of one polarity on the tape 10 results in an output through amplifier 30 and impulses of the opposite polarity produced by a magnetized spot of the opposite polarity on the tape 10 result in an output through the second amplifier 32. In this manner, impulses of the two different types are distinguished and separated.

Although a capacitor 23 has been shown in parallel with switch 20 in both Figs. 1 and 2, it will be readily understood that the capacitor may be omitted if desired as it merely serves to increase the rate of collapse of the counter flux, which rate would be quite rapid even without the capacitor.

While there have been shown and described and pointed out the fundamental novel features of the invention as applied to a preferred embodiment and a modification, it will be understood that various omissions and substitutions and changes in the form and details of the systems illustrated and in their operation may be made by those skilled in the art without departing from the spirit of the invention. It is the intention, therefore, to be limited only as indicated by the scope of the following claims.

What is claimed is:

1. A system for sensing and reproducing voltage impulses recorded as discrete magnetized spots on a record member, comprising a sensing coil positioned adjacent the record member, driving means producing relative movement between the coil and record member whereby the spots pass the coil in succession, each spot in passing the coil providing a varying flux linking the coil windings, a work device coupled to said coil and responsive to a voltage thereacross, a short-circuiting connection across said coil whereby a varying flux linking the coil windings causes a circulating current through said connection and coil to build up a counter flux about the coil, and means for interrupting said connection momentarily during the passing of each spot by the coil while the circulating current has a relatively high magnitude to cause a voltage impulse to be produced across said coil by a collapse of the counter flux.

2. A system for sensing and reproducing voltage impulses recorded as discrete magnetized spots on a record member, comprising a sensing coil positioned adjacent the record member, driving means producing relative movement between the coil and record member whereby the spots pass the coil in succession, each spot in passing the coil providing a varying flux linking the windings of said coil, a work device coupled to said coil and responsive to a voltage thereacross of one polarity only, a short circuiting connection across said coil whereby a varying flux linking the coil windings causes a circulating current through said connection and coil to build up a counter flux about the coil, and means for opening said connection momentarily during the passing of each spot by the coil while the circulating current has a relatively high magnitude in one direction to cause a voltage impulse of said one polarity to be produced across said coil by a collapse of the counter flux.

3. A system for sensing and reproducing voltage impulses recorded as discrete magnetized spots on a record member, comprising a sensing coil positioned adjacent the record member, driving means producing relative movement between the coil and record member whereby the spots pass the coil in succession, each spot in passing the coil providing a varying flux linking the windings of said coil, a work device coupled to said coil and responsive to a voltage thereacross, a short-circuiting connection across said coil whereby a varying flux linking the coil windings causes a circulating current through said connection and coil to build up a counter flux about the coil, means for interrupting said connection momentarily during the passing of each spot by the coil while the circulating current has a relatively high magnitude to cause a voltage impulse to be produced across said coil by a collapse of the counter flux, and a capacitor connected across said coil to increase the rate of collapse of the counter flux.

4. A system for sensing and reproducing voltage impulses recorded as magnetized spots at various ones of a plurality of discrete index points on a record member comprising a sensing coil positioned adjacent the record member, driving means producing relative movement between the coil and record member whereby the index points pass the coil in succession, a magnetized spot in passing the coil providing a varying flux linking the coil windings, a work device coupled to said coil and responsive to a voltage thereacross, a short-circuiting connection across said coil whereby a varying flux linking the coil windings causes a circulating current through said connection and coil to build up a counter flux about the coil, and means for interrupting said connection momentarily during the passing of each index point by the coil at a time when a circulating current produced by a magnetized spot at that index point has a relatively high magnitude, whereby a voltage impulse is produced across said coil by a collapse of the counter flux upon a magnetized spot passing the coil.

5. A system for sensing and reproducing voltage impulses recorded as discrete magnetized spots on a record member, comprising a sensing coil positioned adjacent the record member, driving means producing relative movement between the coil and record member whereby the spots pass the coil in succession, each spot in passing the coil providing a varying flux linking the coil windings, a work device coupled to said coil and responsive to a voltage thereacross, a normally closed switch connected across the coil to short circuit it whereby a varying flux linking the coil windings causes a circulating current through said switch and coil to build up a counter flux about the coil, and means for opening said switch momentarily during the passing of each spot by the coil while the circulating current is at approximately maximum amplitude to cause a voltage impulse to be produced across said coil by a collapse of the counter flux.

6. A system for sensing and reproducing voltage impulses recorded as magnetized spots at various ones of a plurality of discrete index points on a record member, comprising a sensing coil positioned adjacent the record member, driving means producing relative movement between the coil and record member whereby the index points pass the coil in succession, a magnetized spot in passing the coil providing a varying flux linking the coil windings, a work device coupled to said coil and responsive to a voltage thereacross, a short-circuiting connection across said coil whereby a varying flux linking the coil windings causes a circulating current through said connection and coil to build up a counter flux about the coil, means for interrupting said connection momentarily during the passing of each index point by the coil at a time when a circulating current produced by a magnetized spot at that index point has a relatively high magnetude, whereby a voltage impulse is produced across said coil by a collapse of the counter flux upon a magnetized spot passing the coil, and a capacitor connected across said coil to increase the rate of collapse of the counter flux.

7. A system for sensing and reproducing voltage impulses recorded as magnetized spots at various ones of a plurality of discrete index points on a record member, comprising a sensing coil positioned adjacent the record member, driving means producing relative movement between the coil and record member whereby the index points pass the coil in succession, a magnetized spot in passing the coil providing a varying flux linking the coil windings, a work device coupled to said coil and responsive to a voltage thereacross, a normally closed switch connected across said coil to short circuit it whereby a varying flux linking the coil windings causes a circulating current through said connection and coil to build up a counter flux about the coil, and means coupled to said driving means to open said switch momentarily during the passing of each index point by the coil at a time when a circulating current produced by a magnetized spot at that index point has a relatively high magnitude, whereby a voltage impulse is produced across said coil by a collapse of the counter flux upon a magnetized spot passing the coil.

8. A system for sensing and reproducing voltage impulses recorded as discrete magnetized spots on a record member, comprising a sensing coil positioned adjacent the record member, driving means producing relative movement between the sensing coil and record member whereby the spots pass the sensing coil in succession, each spot in passing the sensing coil providing a varying flux linking the sensing coil windings, a short-circuiting connection across said sensing coil whereby a varying flux linking the sensing coil windings causes a circulating current through said connection and sensing coil to build up a counter flux about the sensing coil, means for interrupting said connection momentarily during the passing of each spot by the coil while the circulating current has a relatively high magnitude to cause a voltage impulse to be produced across said sensing coil by a collapse of the counter flux, a second coil in transformer relation with the sensing coil, and a work device connected to said second coil and responsive to a voltage impulse thereacross.

9. A system for sensing and reproducing voltage impulses recorded as discrete magnetized spots on a record member, comprising a sensing coil positioned adjacent the record member, driving means producing relative movement between the sensing coil and record member whereby the spots pass the sensing coil in succession, each spot in passing the sensing coil providing a varying flux linking the sensing coil windings, a short-circuiting connection across said sensing coil whereby a varying flux linking the sensing coil windings causes a circulating current through said connection and sensing coil to build up a counter flux about the sensing coil, means for interrupting said connection momentarily during the passing of each spot by the coil while the circulating current has a relatively high magnitude to cause a voltage impulse to be produced across said sensing coil by a collapse of the counter flux, a capacitor connected across said sensing coil to increase the rate of collapse of the counter flux, a second coil in transformer relation with the sensing coil, and a work device connected to said second coil and responsive to a voltage impulse thereacross.

10. A system for sensing and reproducing voltage impulses recorded as magnetized spots at various ones of a plurality of discrete index points on a record member, comprising a sensing coil positioned adjacent the record member, driving means producing relative movement between the sensing coil and record member whereby the index points pass the sensing coil in succession, a magnetized spot in passing the sensing coil providing a varying flux linking the sensing coil windings, a short circuiting connection across said sensing coil whereby a varying flux linking the sensing coil windings causes a circulating current through said connection and sensing coil to build up a counter flux about the sensing coil, means for interrupting said connection momentarily during the passing of each index point by the coil while a circulating current produced by a magnetized spot at that index point has a relatively high magnitude to cause a voltage impulse to be produced across said sensing coil by a collapse of the counter flux upon a magnetized spot passing the coil, a second coil in transformer relation with the sensing coil, and a work device connected to said second coil and responsive to a voltage impulse thereacross.

11. A system for sensing and reproducing voltage impulses recorded as magnetized spots at various ones of a plurality of discrete index points on a record member, comprising a sensing coil positioned adjacent the record member, driving means producing relative movement between the sensing coil and record member whereby the index points pass the sensing coil in succession, a magnetized spot in passing the sensing coil providing a varying flux linking the sensing coil windings, a normally closed switch connected across said sensing coil to short-circuit it whereby a varying flux linking the sensing coil windings causes a circulating current through said connection and sensing coil to build up a counter flux about the sensing coil, means coupled to said driving means to open said switch momentarily during the passing of each index point by the coil while a circulating current produced by a magnetized spot at that index point has a relatively high magnitude to cause a voltage impulse to be produced across said sensing coil by a collapse of the counter flux upon a magnetized spot passing the coil, a second coil in transformer relation with the sensing coil, and a work device connected to said second coil and responsive to a voltage impulse thereacross.

12. Apparatus for use with a record member having discrete voltage impulses selectively representing two different things recorded thereon as discrete magnetized spots having one polarity for one thing and the opposite polarity for the other, comprising a sensing coil positioned adjacent the record member, driving means producing relative movement between the coil and record member whereby the spots pass the coil in succession, each spot in passing the coil providing a varying flux linking the coil windings beginning in a direction depending upon the polarity of the spot, a short-circuiting connection across said coil whereby a varying flux linking the coil windings causes a corresponding circulating current through said connection and coil to build up a corresponding counter flux about the coil, means for interrupting said connection momentarily during the passing of each spot by the coil while the circulating current has a relatively high magnitude to cause a voltage impulse of a polarity depending upon the polarity of the spot to be produced across said coil by a collapse of the counter flux, a first work device coupled to said coil and responsive to a voltage impulse of one polarity thereacross, and a second work device coupled to said coil and responsive to a voltage impulse of opposite polarity thereacross.

RAYMOND E. CHENEY.
JOHN L. WAGNER.
ROBERT E. LAWHEAD.

No references cited.